(12) United States Patent
Kerner (10) Patent No.: US 11,845,481 B2
(45) Date of Patent: Dec. 19, 2023

(54) RAIL AND TRAIN SYSTEM

(71) Applicant: Franz Kerner, Stuttgart (DE)

(72) Inventor: Franz Kerner, Stuttgart (DE)

( * ) Notice: Subject to any disclaimer, the term of this patent is extended or adjusted under 35 U.S.C. 154(b) by 655 days.

(21) Appl. No.: 16/912,728

(22) Filed: Jun. 26, 2020

(65) Prior Publication Data

US 2020/0406942 A1 Dec. 31, 2020

(30) Foreign Application Priority Data

Jun. 28, 2019 (DE) ...................... 10 2019 004 564.5

(51) Int. Cl.
| | | |
|---|---|---|
| *B61K 1/02* | (2006.01) | |
| *B60P 3/40* | (2006.01) | |
| *B61B 1/00* | (2006.01) | |
| *B61D 15/02* | (2006.01) | |
| *B61D 3/16* | (2006.01) | |
| *B61D 47/00* | (2006.01) | |
| *B61D 7/02* | (2006.01) | |
| *B61D 45/00* | (2006.01) | |
| *B61K 1/00* | (2006.01) | |
| *B61D 3/20* | (2006.01) | |
| *B61B 1/02* | (2006.01) | |

(52) U.S. Cl.
CPC ........ *B61K 1/02* (2013.01); *B60P 3/40* (2013.01); *B61B 1/005* (2013.01); *B61D 3/16* (2013.01); *B61D 3/166* (2013.01); *B61D 3/20* (2013.01); *B61D 7/02* (2013.01); *B61D 15/02* (2013.01); *B61D 45/00* (2013.01); *B61D 47/00* (2013.01); *B61D 47/005* (2013.01); *B61K 1/00* (2013.01); *B61B 1/00* (2013.01); *B61B 1/02* (2013.01)

(58) Field of Classification Search
CPC .......... B61D 15/02; B61D 45/00; B61D 7/02; B60P 3/40
USPC ........................... 104/32.1; 105/159; 410/53
See application file for complete search history.

(56) References Cited

U.S. PATENT DOCUMENTS

| | | | | |
|---|---|---|---|---|
| 1,852,173 A | * | 4/1932 | Lundborg ............. | B61D 47/00 414/809 |
| 3,823,671 A | * | 7/1974 | Straumsnes ............. | B61K 1/00 104/18 |
| 3,902,433 A | * | 9/1975 | Borchert ................ | B61D 3/166 105/182.1 |
| 4,416,571 A | * | 11/1983 | Krause .................... | B60F 1/046 105/159 |
| 4,505,347 A | * | 3/1985 | Prechtel ................. | B62D 63/06 180/14.2 |

(Continued)

FOREIGN PATENT DOCUMENTS

| | | |
|---|---|---|
| CN | 201 235 339 | 5/2009 |
| CN | 106 740 882 | 5/2017 |

(Continued)

*Primary Examiner* — S. Joseph Morano
*Assistant Examiner* — James William Jones
(74) *Attorney, Agent, or Firm* — Gudrun E. Huckett (57) ABSTRACT

A rail and train system has at least a rail pair on which a rail vehicle that is provided with at least one wagon is movable. In the wagon, at least one lifting device is accommodated with which containers can be transported through an opening in the floor of the wagon and which is movable transverse to the length direction of the wagon. The rail vehicle can be provided with a chassis that is formed by two chassis parts that are positioned at a distance behind each other in the travel direction.

12 Claims, 7 Drawing Sheets

(56) References Cited

U.S. PATENT DOCUMENTS

| | | | | |
|---|---|---|---|---|
| 4,961,676 | A * | 10/1990 | Gourdin | B60F 1/046 |
| | | | | 105/215.2 |
| 5,295,442 | A * | 3/1994 | Carpenter | B61B 13/00 |
| | | | | 105/157.1 |
| 5,601,030 | A * | 2/1997 | Brouillette | B61F 3/125 |
| | | | | 105/159 |
| 6,213,028 | B1 * | 4/2001 | Fetterman | B61D 7/02 |
| | | | | 105/238.1 |
| 2013/0236263 | A1 * | 9/2013 | Peterson | B61D 3/166 |
| | | | | 410/44 |
| 2018/0001904 | A1 * | 1/2018 | He | B61D 7/26 |
| 2019/0010666 | A1 * | 1/2019 | Hechenberger | B61D 15/02 |

FOREIGN PATENT DOCUMENTS

| | | | | |
|---|---|---|---|---|
| DE | 4309574 | A1 * | 9/1994 | B61D 1/00 |
| DE | 19629301 | A1 * | 1/1998 | B61D 1/06 |

* cited by examiner

RAIL AND TRAIN SYSTEM

BACKGROUND OF THE INVENTION

The invention concerns a rail and train system with at least a first rail pair on which a first rail vehicle comprising at least one wagon is movable.

Such rail and train systems comprise rail vehicles with which persons and/or goods are transported. The goods are often accommodated in containers which are transported by the rail vehicle. Loading and unloading of the containers into the wagons of the rail vehicle is complicated.

The object of the invention is to embody the rail and train system of the aforementioned kind in such a way that the containers can be accommodated in a simple but still reliable way in the rail vehicle and transported by it.

SUMMARY OF THE INVENTION

This object is solved for the rail and train system of the aforementioned kind in accordance with the invention in that, in the wagon of the first rail vehicle, at least one lifting device is accommodated with which containers can be transported through an opening in the floor of the wagon and which is moveable transverse to the length direction of the wagon.

The rail and train system according to the invention is characterized in that at least one lifting device is accommodated in the wagon of the rail vehicle. With the lifting device, the containers can be lifted through an opening in the wagon floor into the wagon or can be transported away again through the floor opening. The lifting device is configured such that it can transport the containers from a region below the wagon upwardly into the desired position of the container within the wagon. The lifting device is adjustable transversely to the length direction of the wagon and thus to its travel direction. In this way, the containers, after having been lifted, can be laterally moved in order to put them down, for example, at the side walls of the wagon. In this way, it is ensured that the region through which the containers are lifted from below is kept free at all times.

Advantageously, the rail vehicle is a wide-body train whose wagons in comparison to conventional wagons comprise significantly larger dimensions with regard to the width as well as the height as well as the length. Thus, these wagons can have, for example, a height of approximately 9 meters, a length of approximately 21 meters, and a width of, for example, approximately 9 meters. For such wide-body trains, corresponding large track gauges are used which amount to approximately 6 meters, for example.

For transferring the containers, it is possible to employ a further train whose wagons have significantly smaller dimensions and which can travel in a region below the wide-body train. For transfer, the trains that are traveling above each other are moved at the same speed so that, while both trains are traveling, the containers can be transferred upward from below or downward from above.

An advantageous embodiment results when the lifting device is movable along a guide which is extending transverse to the length direction of the wagon. This guide extends in the region above the cargo space for the containers. Along the guide, the lifting device can be moved reliably laterally in order to move the containers laterally away after having been lifted into the wagon and to put them down in the region of the side walls of the wagon.

The containers are advantageously stacked near the side walls of the wagon such that between the stacked containers a loading region remains. In this way, it is possible to continue to lift the containers from below through the wagon opening upwardly into the wagon.

In order to ensure a reliable support of the containers in the wagon, the wagon advantageously comprises a chassis that is provided with at least four axles.

In this context, advantageously at least two axles are positioned in the travel direction at the leading end and at least two axles in the travel direction at the rearward end of the chassis. In this way, a reliable support of the containers is ensured.

It is advantageous in this context when at least one axle at the leading end and at the rearward end of the chassis is provided with wheels with a wheel flange. The wheels on the other axles can then be configured without wheel flange and serve only for supporting the wagon on the rail pair.

The chassis is advantageously longer than the containers to be transported.

The length of the chassis and thus also of the wagon of the rail vehicle can be selected in this context such that a cargo space is formed in the wagon in the travel direction in front of and/or behind the containers. In this cargo space, further cargo goods can be accommodated and transported in addition to the containers.

A further advantage results when the wagon comprises at least one cargo space laterally adjacent to the containers. This cargo space can then also be used for transporting additional cargo goods. In this lateral cargo space, for example, panels or walls as they are used e.g. for prefabricated homes can be transported. In this way, the interior of the wagon of the rail vehicle can be used in an optimal way.

A further advantageous embodiment results when at least one top cargo space is provided in the region above the containers. Here, additional cargo goods can be accommodated also.

In a further embodiment according to the invention, the chassis is formed by two chassis parts which are positioned in the travel direction at a distance behind each other. They are independent of each other and are fastened advantageously to the lower containers.

Due to such an advantageous embodiment, the chassis can be simply adapted to containers of varying lengths. Therefore, it is not required to provide chassis of varying lengths for containers of varying lengths. Instead, the chassis parts are attached to the leading end and the rear end of the containers so that they can be transported without problem. The chassis parts can be fastened in a simple way at the containers. This attachment is, of course, designed to be detachable so that the containers, when they are to be unloaded, can be simply detached from the chassis parts.

The chassis parts have advantageously at least two axles, respectively. It is particularly advantageous when the chassis parts comprise three axles so that with them also corresponding loads can be absorbed. The wheels of at least one axle of the chassis parts can be provided with a wheel flange while the wheels of the other axles of the chassis parts are without wheel flange and serve only for supporting the container on the rail pair.

The subject matter of the application results not only from the subject matter of the individual claims but also from all specifications and features disclosed in the drawings and the description. Even if they are not subject matter of the claims, they are considered important to the invention inasmuch as, individually or in combination, they are novel relative to the prior art.

Further features of the invention result from the additional claims, the description, and the drawings.

BRIEF DESCRIPTION OF THE DRAWINGS

The invention will be explained in more detail with the aid of some embodiments illustrated in the drawings.

DESCRIPTION OF PREFERRED EMBODIMENTS

Figure 1:
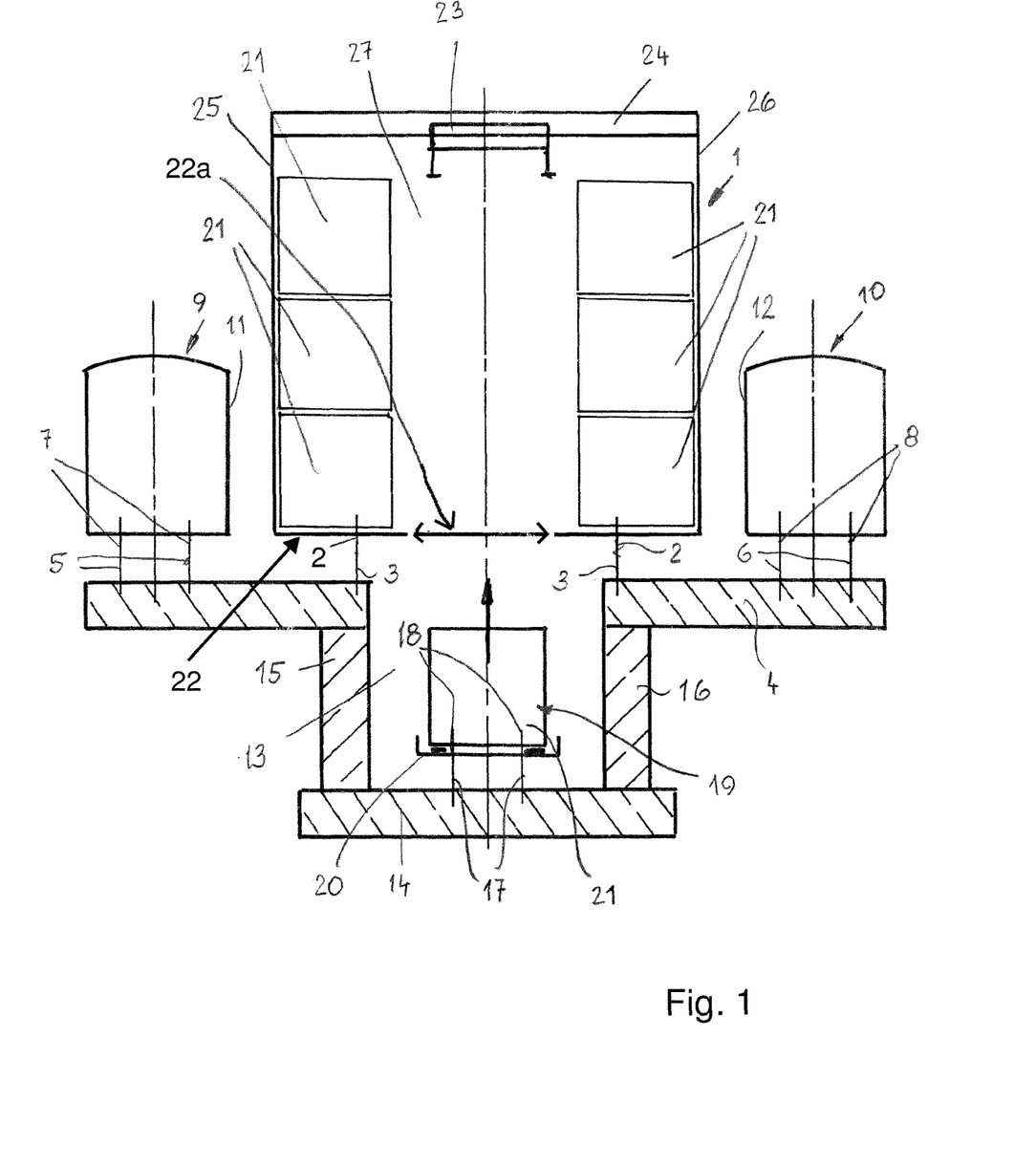
FIG. 1 shows in a schematic illustration a first embodiment of a rail and train system according to the invention.
Figure 1A:
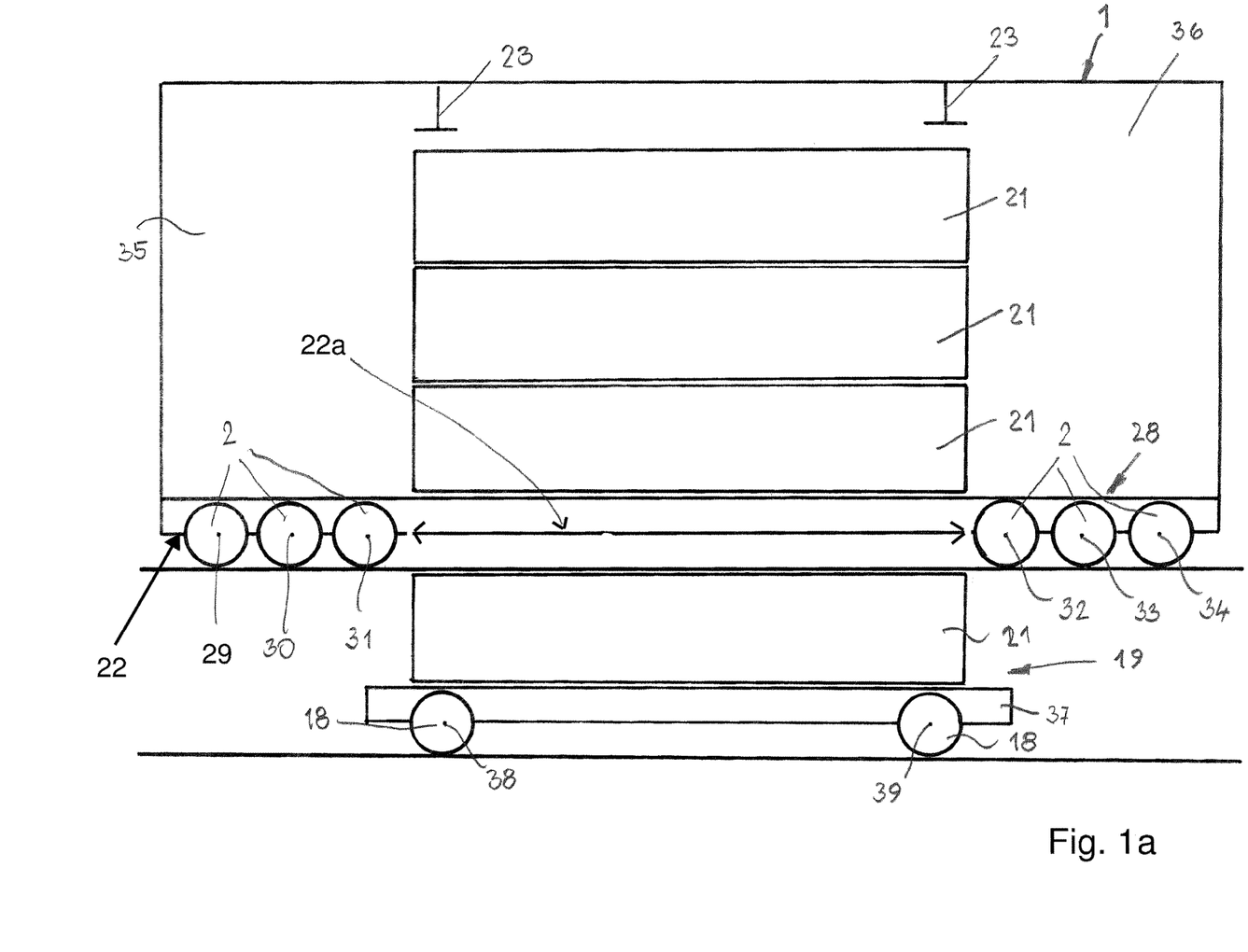
FIG. 1a shows in a schematic illustration and in a side view a part of the rail and train system according to FIG. 1.

The rail and train system according to FIGS. 1 and 1a has a wide-body train 1 with which persons and/or goods can be transported. The wagons of the wide-body train 1 can have, for example, a width of approximately 6 to 9 meters and a height of, for example, approximately 6 to 9 meters. Due to these dimensions, there is the possibility that with the wagons of the wide-body train 1 not only a large numbers of persons can be transported but also larger goods, for example, even passenger cars, trucks, and the like.

The wide-body train 1 may comprise electrical power collectors (not illustrated) which are connected to an overhead line (not illustrated) in a known way.

The wagons of the wide-body train 1 are supported on wheels 2 which run on rails 3 which are arranged on a foundation 4, respectively.

On the foundation 4, on both sides of the rails 3 at a distance, further rails 5, 6 are provided on which wheels 7, 8 of trains 9, 10 are running. The wagons of the trains 9, 10 have substantially smaller dimensions than the wagons of the wide-body train 1. The rails 5, 6 have advantageously a common track gauge of approximately 1.5 m.

The wide-body train 1 travels at a speed which may amount to, for example, 120 to 150 km/h. The train 9 is an express train which can travel at high speeds and can accommodate goods and persons. Travel speeds of more than 300 or 400 km/h are possible for the train 9. With the train 9, persons or goods are transported between a train station of origin and a destination train station. As a result of the high travel speed, short travel times results. In this context, an advantageous contribution is provided in that the train 9 must not stop for the person/goods exchange with the wide-body train 1.

In order for the exchange between the trains 1 and 9 to be possible, the speed of the train 9 is reduced such that the train 9 travels at the same speed as the wide-body train 1. During the exchange, the trains 1, 9 move parallel to each other.

The train 10 is a conventional train which can travel to different train stations. For a person/goods exchange with the wide-body train 1, the train 10 travels adjacent to the wide-body train 1 at the same speed, in the same way as has been explained in connection with train 9.

In order to be enable the person/goods exchange, the trains 1, 9, 10 at their sides facing each other are provided with corresponding transfer sites. Thus, the trains 9, 10 can be provided with extendable or foldable transfer devices at their side walls 11, 12 facing the wide-body train 1. These transfer devices are connected reliably and fixedly with the wide-body train 1 so that the passengers can embark and disembark across the transfer devices safely into the wide-body train 1 or into the trains 9, 10 and the goods can be exchanged. The rails 3, 5, 6 which are positioned parallel to each other are laid such that the trains 1, 9, 10 can move at only a minimal distance next to each other, for example, at a distance of only approximately 1 m. In this context, the transfer devices are only short so that a safe transfer between the trains is ensured.

Since the trains 1, 9, 10 must not stop for the passenger/goods exchange, an optimal high travel speed of the train 9 results. Therefore, the travel times from the train station of origin to the destination train station can be significantly shortened.

The tracks 5, 6 for the trains 9, 10 extend parallel to the rails 3 of the wide-body train 1. In order for the train 10 to be able to travel to different train stations in a conventional way, it can be redirected by means of switches from track 6 to other tracks.

The foundation 4 is provided with a depression 13 which is delimited by a bottom 14 and two parallel positioned side walls 15, 16. The side walls 15, 16 extends advantageously vertically.

At the bottom 14, rails 17 are provided on which wheels 18 of a train 19 are running. It has a chassis 20 on which the at least one container 21 is supported. It can be transferred during travel into the wide-body train 1. As in regard to the trains 9, 10, during the transfer process the travel speeds of the trains 1, 19 are synchronized so that the two trains can travel above each other at the same speed. The track 17 has advantageously the same track gauge as the tracks 5, 6.

The wide-body train 1 is provided at its floor 22 with a closable transfer opening 22a (only schematically indicated) that will be opened for the transfer process. In the ceiling region at least one lifting device 23 is provided with which the containers 21 of the train 19 can be lifted into the wide-body train 1. The lifting device 23 is advantageously a crane which is moveable transverse to the travel direction of the wide-body train 1 along a guide 24 so that the containers 21 can be deposited in the region of the side walls 25, 26.

In the embodiment, three containers 21 are stacked on each other at the side walls 25, 26, for example. The dimensions of the wagon of the wide-body train 1 are selected such that the individual containers 21 of the train 19 can be lifted into the wide-body train 1 in the region 27 between the container stacks.

Depending on the length of the containers 21, further lifting devices are provided in the corresponding wagon of the wide-body train 1. In FIG. 1a, for example, it is illustrated that the wide-body train 1 comprises in its corresponding wagon two lifting devices 23 which are positioned at a distance behind each other and with which also longer containers 21 can be transported. Both lifting devices 23 can be moved perpendicularly to the travel direction of the wide-body train 1 in the described way in order to move the containers 21, which have been pulled out of the train 19, to the side walls 25, 26.

The wide-body train 1 or its wagon has a chassis 28 (FIG. 1a) at which six axles 29 to 34 are supported, each provided with wheels 2. Three axles 29 to 31 and 32 to 34 are provided, viewed in the travel direction, at the leading end region and rearward end region of the chassis 28, respectively.

The wheels of the axles 30, 33 can be provided with a wheel flange while the wheels 2 of the other axles 29, 31, 32, 34 are provided without a wheel flange and serve only for supporting the wagon.

The distance measured in the travel direction between the axles 29 to 31 and 32 to 34 is so large that the containers 21 can be lifted from the train 19 in upward direction into the wagon of the wide-body train 1.

Advantageously, the corresponding wagons of the wide-body train 1 are so long that cargo regions 35, 36 are available in the region adjacent to the stacked containers 21 and can be used for accommodating goods other than containers.

The wagon of the wide-body train 1 illustrated in FIG. 1*a* can have, for example, a length of approximately 21 meters and a height of, for example, approximately 9 meters. In such wide-body wagons 1, not only conventional containers but also containers with extra length can therefore be transported. The chassis 28 with the described six axles 29 to 34 ensures a reliable support of the wagon load.

The train 19 has wagons with the conventional dimensions so that it can travel within the depression 13 below the wide-body train 1 when a transfer process is to take place. The train 19 has a chassis 34 with two axles 38, 39 on which the wheels 18 are provided. Only one container 21 is supported on the chassis 37.

The trains 9, 10, 19 each have a drive which can be in the form of electric motors, for example. Of course, also other drives can be used for the trains 9, 10, 19.

During the transfer process, the trains 1, 9, 10, 19 travel at the same speed adjacent or above each other so that the transfer process can be performed easily. As soon as the transfer process is terminated, the train 9 can be accelerated again to its travel speed. The wide-body train 1 continues to travel at its travel speed which must not be reduced during the exchange process. The train 10 travels, for example, to the next switch. Here, it is rerouted to a different track in order to travel to a corresponding train station. Here, the passengers can disembark and the goods can be unloaded. Also, new passengers can embark and new goods can be loaded at this train station. The train 10 can subsequently travel in a conventional way to other train stations. However, it is also possible that the train 10 travels again to track 6 and enables person/goods exchange with the next wide-body train 1 in the described way.

The embodiment according to FIGS. 2 and 3 differs initially from the preceding embodiment in that the foundation 4 has no depression in which a train can move below the wide-body train 1. The rail and train system according to FIGS. 2 and 3 has therefore, in addition to the wide-body train 1, only the trains 9, 10 traveling alongside.

In the corresponding wagons of the wide-body train 1, the containers 21 are accommodated which are, for example, arranged in three rows and in three layers. In contrast to the preceding embodiment, these containers 21 are not transported through the floor into the wagon but laterally moved into the wagon.

In the region above the containers 21, a cargo space 40 is provided which has a height of 1.4 to 1.5 meters, for example. The length of this cargo space 40 corresponds to the length of the wagon of the wide-body train 1 and can be approximately 21 meters, for example. In the cargo space 40, additional cargo goods can be accommodated in addition to the containers 21.

Figure 2:
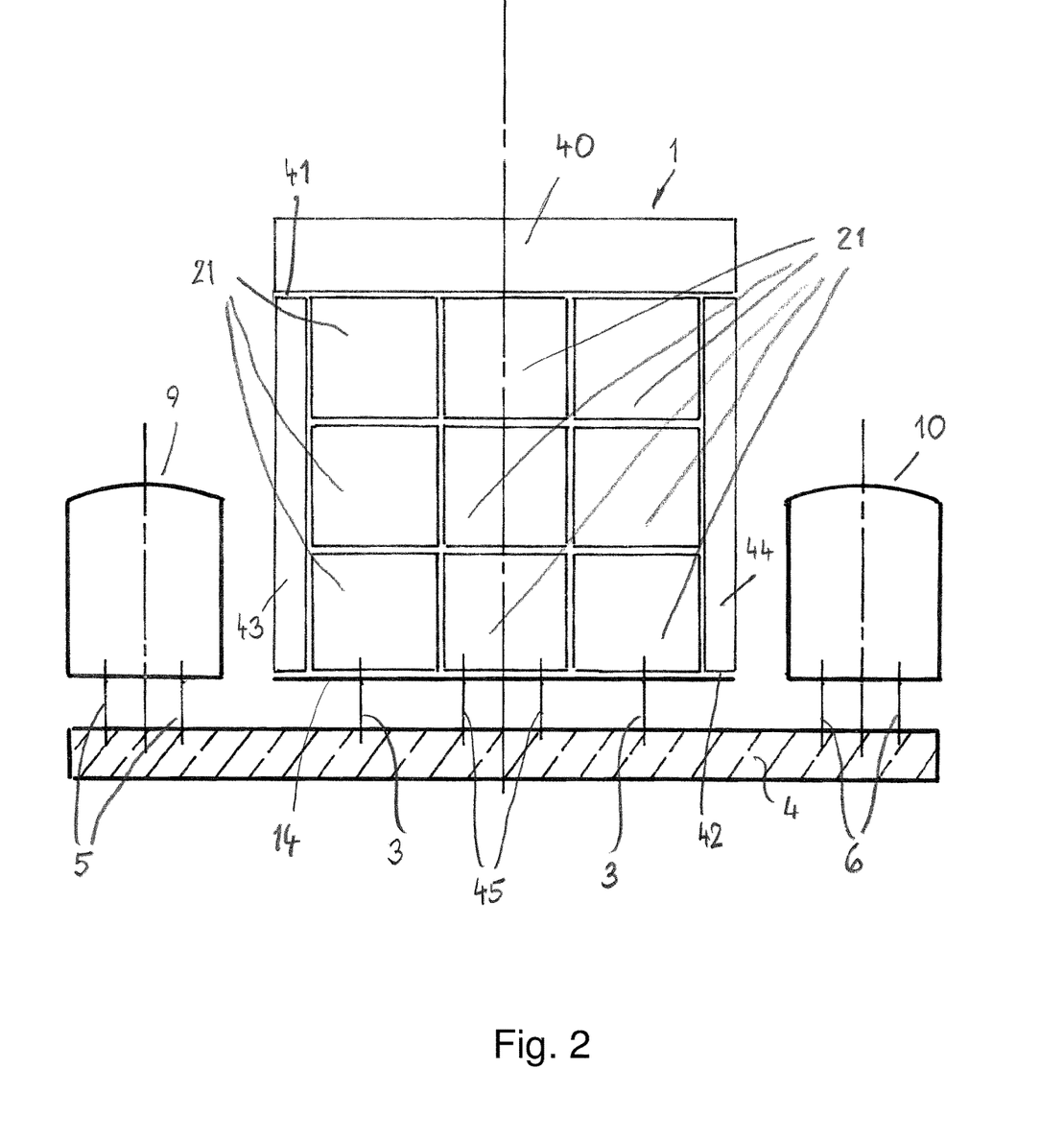
FIG. 2 shows in an illustration corresponding to FIG. 1 a second embodiment of a rail and train system according to the invention.

As can be seen in FIG. 2, the cargo space 40 has such a width transverse to the travel direction that it projects laterally past the containers 21. In this way, in the region adjacent to the outwardly positioned containers 21 a further cargo space 41, 42 is formed which extends across the length and height of the wagon of the wide-body train 1. In these additional cargo spaces 41, 42, further cargo goods 43, 44 can be accommodated, for example, panels, walls and the like as they are used, for example, for prefabricated homes.

The chassis 28 (FIG. 3) is of the same configuration as in the preceding embodiment so that reference is being had to the corresponding description above.

Figure 3:
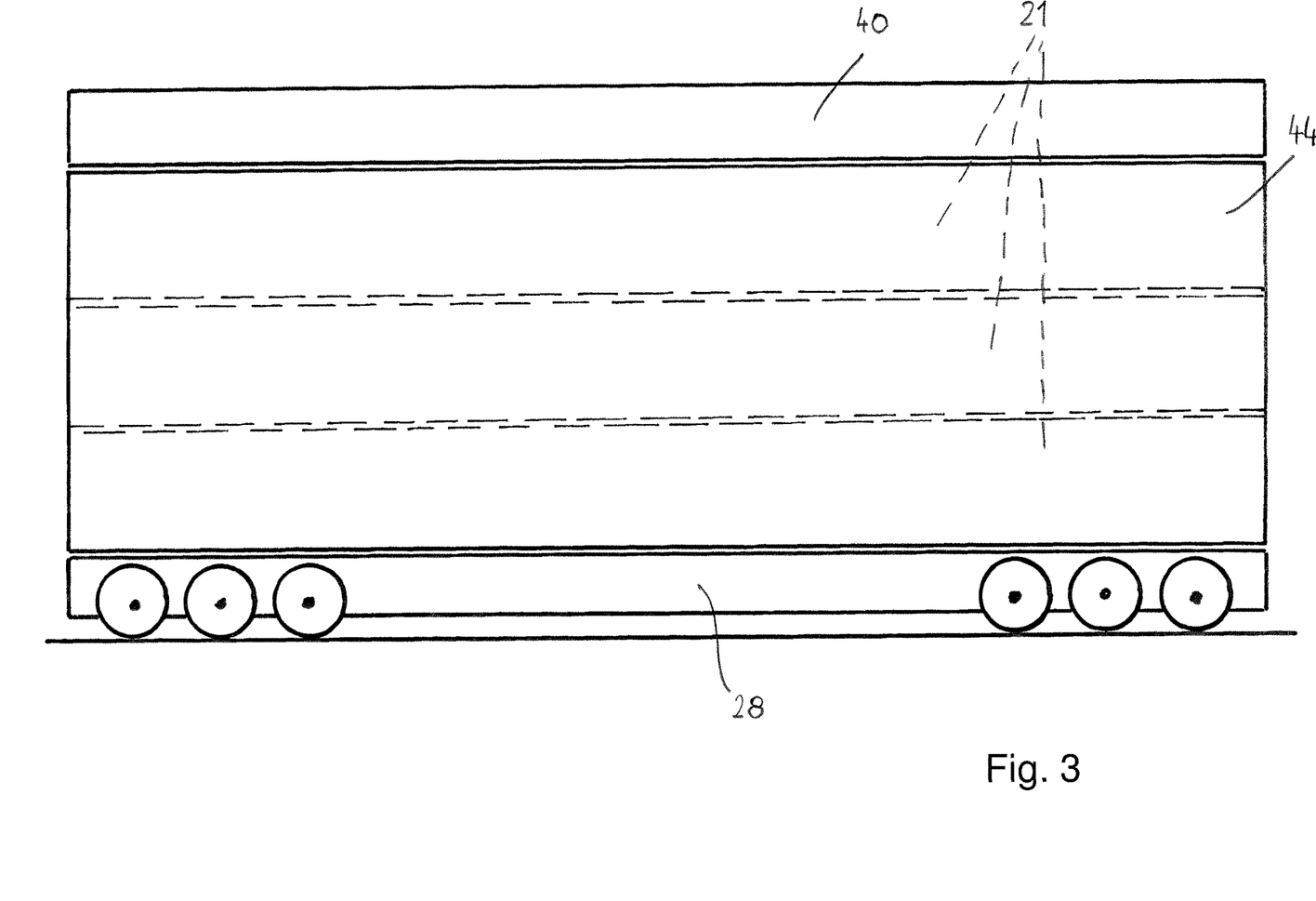
FIG. 3 shows in a schematic illustration and in a side view a wagon of a wide-body train of the rail and train system according to FIG. 2.
Figure 4:
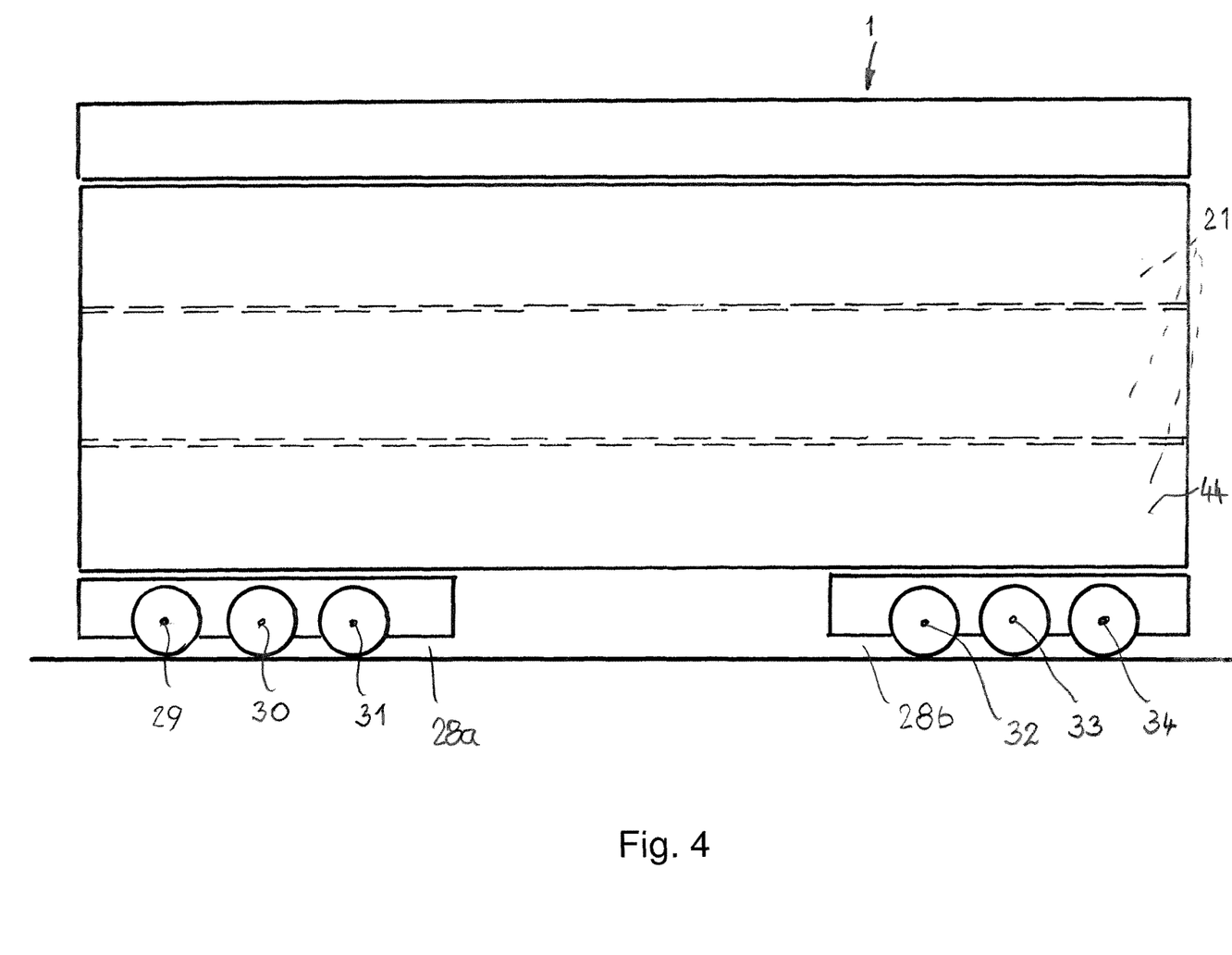
FIG. 4 shows in an illustration corresponding to FIG. 3 a side view of a further embodiment of a wagon of a wide-body train.

The embodiment according to FIG. 4 differs from the embodiment according to FIGS. 2 and 3 in that the chassis 28 is formed by two chassis parts (halves) 28*a* and 28*b*. The two chassis parts 28*a*, 28*b* each comprise three axles 29 to 31, 32 to 34. The chassis parts can be connected immediately to the respective lower containers 21 within the wagon of the wide-body train 1. The chassis parts 28*a*, 28*b* are positioned in the travel direction of the wide-body train 1 at a distance behind each other and are provided near the ends of the container 21 to which they are fastened. The chassis parts 28*a*, 28*b* are attached such that the container 21 to which they are fastened does not project past them in the travel direction of the wide-body train 1.

Due to the two chassis parts 28*a*, 28*b* that are separate from each other, containers 21 of varying lengths can be transported without problem. Depending on the length of the container to be transported, the chassis parts 28*a*, 28*b* have varying distances from each other in the travel direction. The conversion of the chassis parts 28*a*, 28*b* for adaptation to containers 21 of varying lengths can be carried out easily and without problems.

Figure 5:
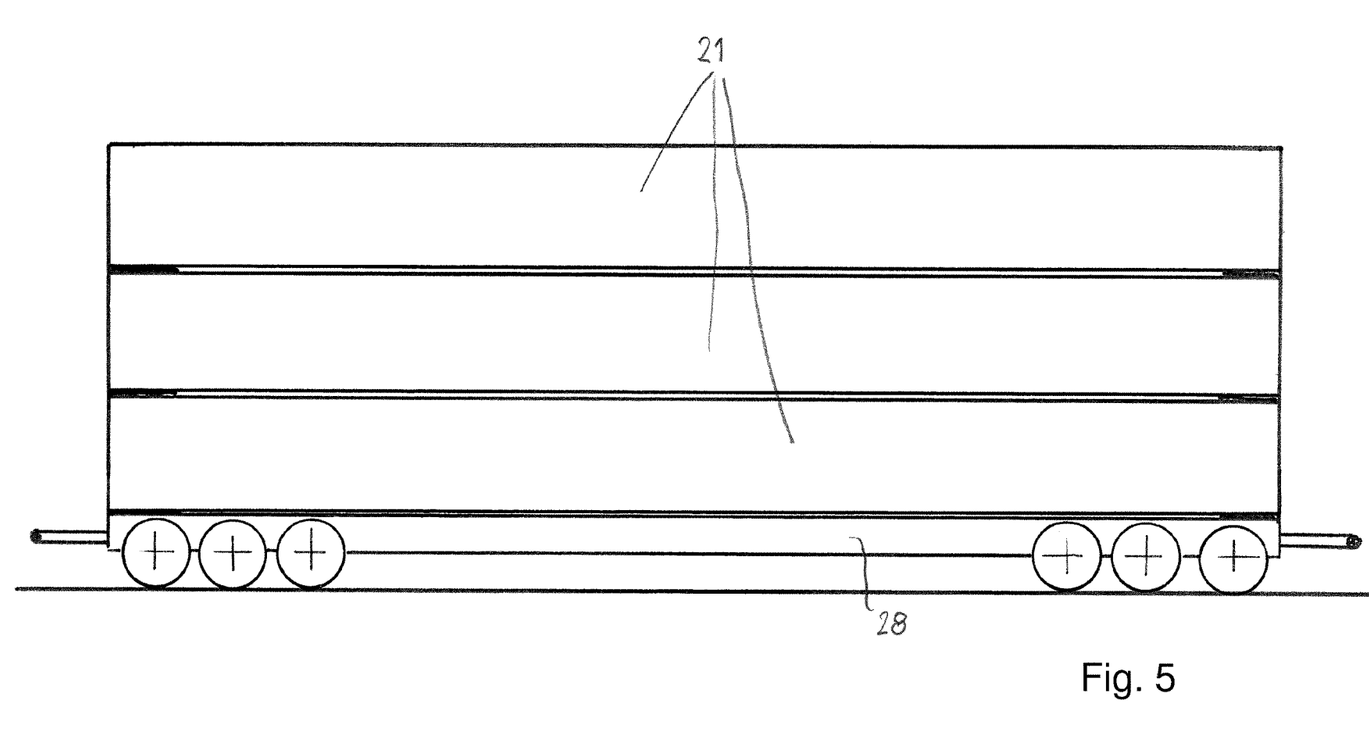
FIG. 5 shows in an illustration corresponding to FIG. 3 a further embodiment of a wagon of a wide-body train of the rail and train system according to the invention.

In the embodiment according to FIG. 5, the chassis 28 is embodied in accordance with the embodiments according to FIGS. 1 to 3. On the chassis 28, the containers 21 are supported, advantageously in stacks adjacent to each other, as has been illustrated in an exemplary fashion in FIG. 1 or FIG. 2. In this case, the wagon of the wide-body train has no wagon body but only the chassis 28 on which the containers 21 can be supported. The stacked containers 21 are placed on each other in a suitable way such that they will not accidentally fall off the chassis 28 during transport.

Figure 6:
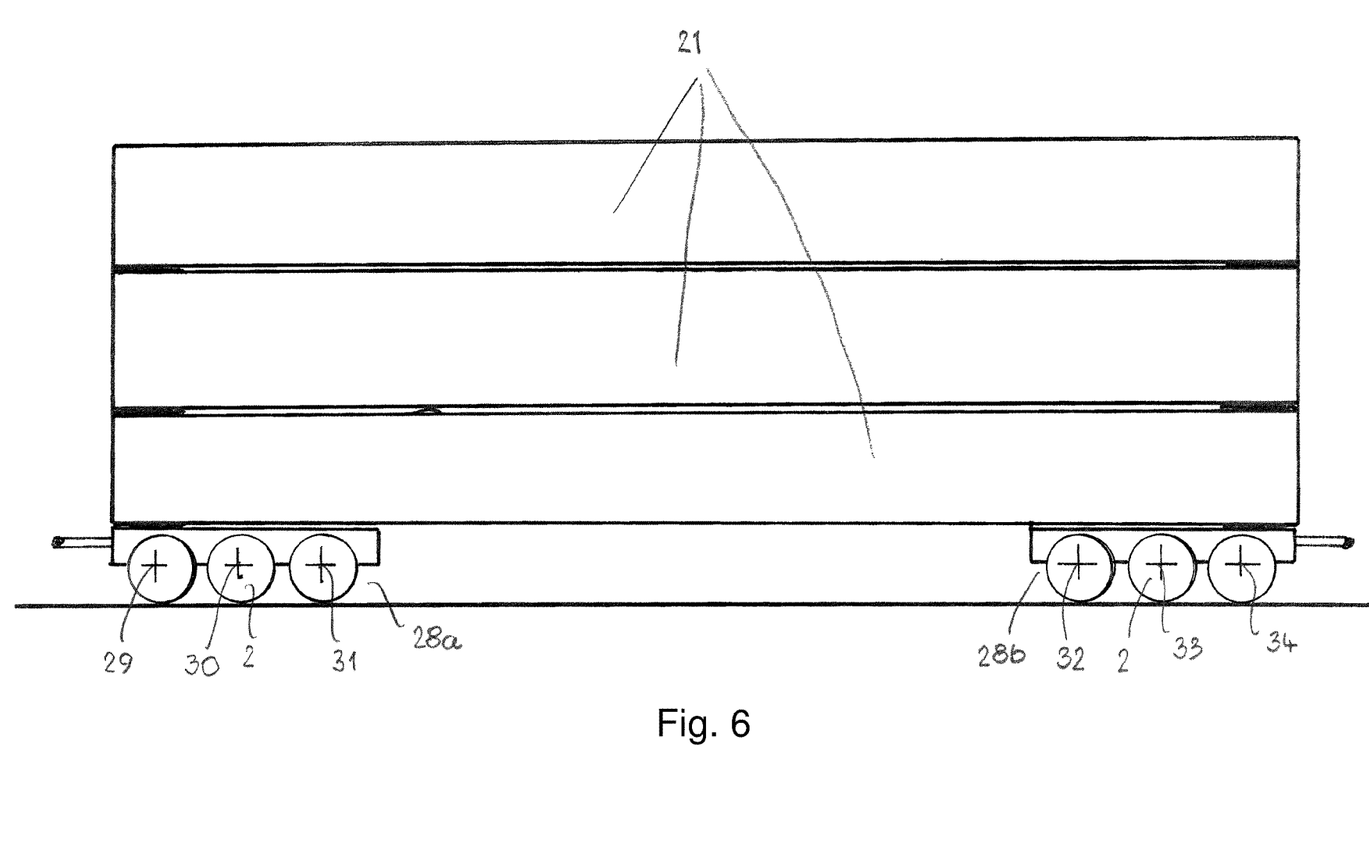
FIG. 6 shows in an illustration corresponding to FIG. 3 a further embodiment of a wagon of a wide-body train of the rail and train system according to the invention.

The embodiment according to FIG. 6 differs from the embodiment according to FIG. 5 in that, instead of the chassis 28 extending across the length of the containers 21, the two chassis parts 28*a*, 28*b* in accordance with the embodiment of FIG. 4 are provided. They are connected immediately with the lower containers 21 and in other respects are of the same configuration as the chassis parts according to FIG. 4. The wheels 2 of the respective middle axles 30, 33 of the chassis parts 28*a*, 28*b* may be provided with wheel flanges while the wheels 2 of the other axles 29, 31, 32, 34 may comprise wheels without wheel flange.

The described rail and train system enables in an exemplary fashion that passengers and/or goods can move during the exchange process from train 10 through the wide-body train 1 into the express train 9 with which, after the exchange process, they can be transported at high speed. On the other hand, there is the possibility that goods and/or persons from train 9 can reach the train 10 through the wide-body train 1 during the transfer process. The train 10 can then travel in the described way to a train station in order to unload goods and/or persons.

The wide-body train 1 in the illustrated embodiment is designed such that a plurality of containers 21 can be arranged above each other in the train 1. This three-story configuration of the wagon of the wide-body train 1 is however not mandatory. The wagons of the wide-body train 1 can also have a reduced height so that in the wagons only one layer or two layers of containers 21 stacked on each other can be accommodated.

The containers 21 in the wide-body train 1 are to be understood only as examples. For example, instead of the containers 21, also trucks, buses and the like can be arranged adjacent and/or behind each other in the wide-body train. The wagons of the wide-body train 1 have therefore varying heights, depending on the goods to be stored.

As has been shown in an exemplary fashion in FIG. 2, between the rails of the track 3 further tracks 45 can be positioned whose track gauge corresponds to the track gauge of the rails 5, 6. Then trains with conventional track gauge can also travel in the region of the wide-body train 1.

The specification incorporates by reference the entire disclosure of German priority document 10 2019 004 564.5 having a filing date of Jun. 28, 2019.

While specific embodiments of the invention have been shown and described in detail to illustrate the inventive principles, it will be understood that the invention may be embodied otherwise without departing from such principles.

What is claimed is:

1. A rail and train system comprising:
   at least a first rail pair;
   a first rail vehicle comprising at least one wagon and configured to move on the at least one first rail pair in a travel direction, wherein the first rail vehicle serves to transport passengers and/or cargo;
   wherein the at least one wagon comprises a floor with an opening and further comprises at least one lifting device configured to transport containers through the opening in the floor of the wagon;
   wherein the at least one lifting device is configured to move transverse to a length direction of the at least one wagon;
   wherein the at least one wagon comprises opposed side walls and further comprises floor regions near the opposed side walls, the floor regions configured to accommodate stacks of the containers;
   wherein the opening in the floor is located between the floor regions;
   wherein the at least one lifting device is mounted inside the at least one wagon at a level above the stacks of the containers to be accommodated on the floor regions;
   wherein the at least one wagon further comprises a guide extending transverse to the length direction of the at least one wagon, wherein the at least one lifting device is configured to move along the guide;
   wherein a loading region of the at least one wagon extends from the floor of the at least one wagon to the at least one lifting device, wherein the at least one lifting device is configured to move into an area above the stacks of the containers to be accommodated.

2. The rail and train system according to claim 1, wherein the at least one wagon comprises a chassis comprising at least four axles.

3. The rail and train system according to claim 2, wherein at least two of the at least four axles are provided in the travel direction at a leading end of the chassis and at least two axles of the at least four axles are provided in the travel direction at a rearward end of the chassis.

4. The rail and train system according to claim 3, wherein at least one of the axles at the leading end of the chassis and at least one of the axles at the rearward end of the chassis comprise wheels with a wheel flange.

5. The rail and train system according to claim 2, wherein the chassis is longer than the containers.

6. The rail and train system according to claim 1, wherein the at least one wagon comprises a cargo space in front of and/or behind the containers in the travel direction.

7. The rail and train system according to claim 1, wherein the at least one wagon comprises at least one lateral cargo space alongside the containers in the travel direction.

8. The rail and train system according to claim 1, wherein the at least one wagon comprises at least one upper cargo space in a region above the containers.

9. The rail and train system according to claim 8, wherein the at least one wagon comprises at least one lateral cargo space alongside the containers in the travel direction and wherein the upper cargo space delimits the at least one lateral cargo space in an upward direction.

10. The rail and train system according to claim 1, wherein the at least one first rail vehicle is a wide-body train.

11. The rail and train system according to claim 1, further comprising at least one second rail pair adjacent to the at least one first rail pair, wherein the at least one first rail pair has a larger track gauge than the at least one second rail pair.

12. The rail and train system according to claim 11, wherein the at least one second rail pair extends parallel to the at least one first rail pair and is configured to carry an express train.

* * * * *